United States Patent [19]

Smart

[11] Patent Number: 5,141,365
[45] Date of Patent: Aug. 25, 1992

[54] BACKFILLING IN MINES

[75] Inventor: Roderick M. Smart, Fortrose, Scotland

[73] Assignee: Fosroc International Limited, Nechells, United Kingdom

[21] Appl. No.: 663,768

[22] Filed: Mar. 1, 1991

Related U.S. Application Data

[63] Continuation of Ser. No. 377,342, Jul. 7, 1989, abandoned.

[30] Foreign Application Priority Data

Jul. 14, 1988 [ZA] South Africa .................. 88/5086

[51] Int. Cl.$^5$ ............................................ E02D 15/00
[52] U.S. Cl. ................................. 405/267; 405/258; 405/266
[58] Field of Search ............... 405/266, 267, 128, 258, 405/263; 166/293, 295

[56] References Cited

U.S. PATENT DOCUMENTS

| | | | |
|---|---|---|---|
| 3,274,784 | 9/1966 | Shock et al. | 405/128 |
| 3,440,824 | 4/1969 | Doolin | 405/267 |
| 3,459,003 | 8/1969 | O'Neal | 405/128 |
| 3,582,375 | 6/1971 | Tragesser | 405/266 X |
| 3,583,165 | 6/1971 | West | 405/266 |
| 3,672,173 | 6/1972 | Paramore et al. | 405/266 |
| 4,019,327 | 4/1977 | Kempster | 405/266 X |

Primary Examiner—Dennis L. Taylor
Attorney, Agent, or Firm—Caesar, Rivise, Bernstein, Cohen & Pokotilow, Ltd.

[57] ABSTRACT

A void in a mine is backfilled by a backfill slurry comprising water, an inert filler, e.g. mine tailings, and a binder, e.g. cement, lime or slag, to which a gelling agent, e.g. sodium silicate, is added just before placement.

14 Claims, 1 Drawing Sheet

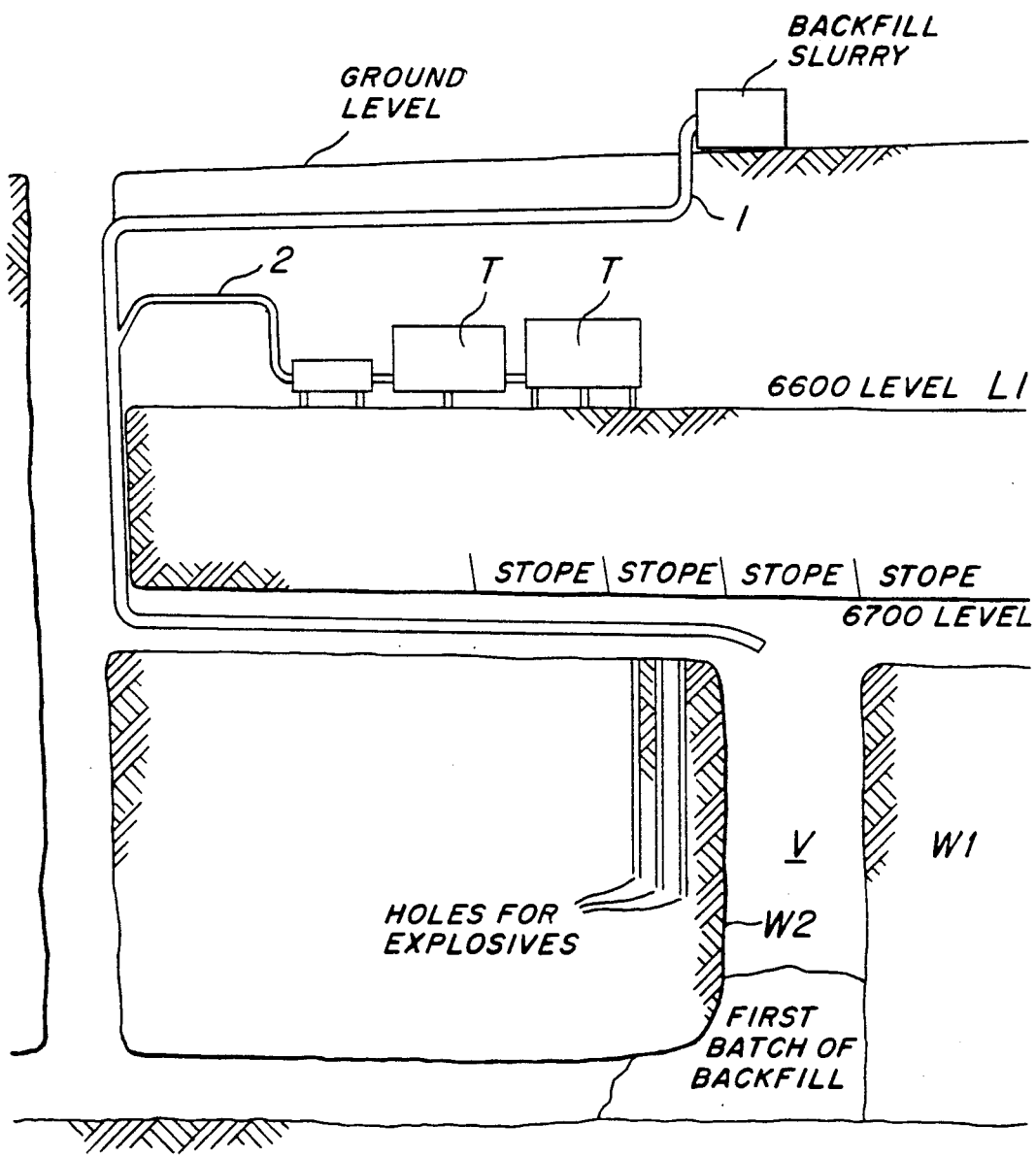

BACKFILLING IN MINES

This application is a continuation of application Ser. No. 07/377,342, filed Jul. 7, 1989, now abandoned.

The invention relates to backfilling in mines, tunnelling or the like, i.e. the practice of placing a fill of material in an underground void. A backfill material may be used to replace the ore or minerals extracted for example in "cut and fill" or "bulk" mining, and in wide void/cavity filling. The purpose of backfilling may be to provide support for the surrounding roof and walls, to provide a working platform or to provide a means of waste disposal.

The fill material comprises materials which are substantially inert to reaction with binders or water, e.g. mine tailings and other forms of waste, crushed rockfill, aggregate, sands and mixtures of these; optionally with hydraulically setting binder additives such as cement, slag, pulverised fuel ash and the like. The fill is usually transported to the void for placement as a slurry or paste of solids in water. The water content is usually 15 to 55%, preferably 25 to 40% by weight. It is necessary for the placed slurry to dewater until the placed material has consolidated and if required, attained predetermined properties so that working in adjacent areas can take place. The dewatering takes place by drainage and decantation systems. It is sometimes important that the finally placed fill resist vibration such as that caused by blasting or a seismic event. In other cases, there is need to support the weight of machinery. The run-off of excess water is inconvenient to the operation of the mine and substantial costs can be incurred in pumping the water away from the areas in which it accumulates. The run-off water may contain significant quantities of very fine particles which can include a significant proportion of the binder. This can settle in drains, gulleys etc. which requires silt clearance from time to time. The water may also cause problems of pollution. The backfill material may be slow to dewater in which case sudden vibration, e.g. rock burst or blasting can cause mass flow with sudden release and flooding. The slimes can cause excess wear of equipment, unsafe working conditions and a wet environment. For safety reasons therefore it may be necessary to wait for an inconvenient length of time before mining can proceed adjacent the placed backfill. In addition, there is a need to wait for drainage to occur during filling of a void to prevent excessive hydrostatic pressure being generated. This is time consuming and limits the rate of backfilling. Barricades have to be built strong enough to resist the hydrostatic pressures generated. Also, the material may be slow to set and harden which limits the progress of mining. The water run-off causes a reduction in the volume of the backfill which is revealed by shrinkage. The resulting void may require to be topped up and this slows down mining progress. Unclassified tailings cannot be used as the fines therein interfere with water drainage. Wet undrained slimes can lead to collapse of the placed fill when exposed. Flocculants at extra cost must often be added to facilitate drainage.

The invention is based on the realisation that by suitably formulating the slurry it is possible to cause the placed slurry to set and attain the desired properties while trapping or binding up the water therein, a feature which the mining engineer has hitherto considered to be impossible. The invention is based on the further realisation that a gelling agent can be used in the binding of particualte material associated with a high proportion of water to set to a load bearing condition.

It is one object of the invention to provide a method of filling a cavity or void by placing therein a backfill slurry in which method the release of water is significantly reduced, so reducing the problems indicated.

The Figure of the drawing shows a view of the underground void being filled.

In one aspect the invention provides a method of forming an infill in an underground void, comprising forming a backfill slurry of water, substantially inert filler and a binder, transporting the slurry to the void, placing the slurry, and allowing or causing the material to set characterised in that a gelling agent is added to the slurry while or just before the slurry is placed, the quantity of gelling agent being sufficient to cause the slurry to form an infill containing substantially all the water of the slurry.

The gelling agent may be a silicate such as sodium silicate. The sodium silicate may have a weight ratio of $SiO_2:Na_2O$ of from about 1 to about 3.85, preferably 2.0 to 3.3. The pH value ranges from about 13.2 to about 10.9 and the solids content from 50 to 28%. A silica sol may be used. The gelling agent may also be a sulphate such as aluminium sulphate or magnesium sulphate. Organic gelling agents may also be used.

The proportion by weight of the gelling agent in the slurry may vary according to application and may in the case of sodium silicate, for example, range from about 0.3% to about 8.0%. The proportion of gelling agent is related to the prevention of the escape of water. In addition, the gelling agent ensures that the backfill material sets homogeneously and preferably causes an increase in the rate of development of early strength. While higher concentrations of gelling agent can be used this is not encouraged for reasons of cost and because the strength attained can fall off at high loadings. Suitable values are in the range of from about 0.5% to about 2.0%. The gelling agent may be introduced into the slurry while or just before the slurry is being discharged into the void or cavity from a supply pipeline; the period should be sufficient to ensure adequate mixing and less than that at which overmixing or premature setting occurs. Usually the period will be a few seconds or minutes. The gelling agent may be mixed with the slurry in any appropriate way. For example use may be made of a static mixing head or reliance upon turbulent flow.

The slurry may contain a wide range of settable binder additives in a proportion of about 0.5 to about 15% by weight of the slurry. Ordinary Portland cement may be present in a proportion by weight of from 0.5% to 15% (or more) and preferably is in the range of from 2% to 10%, relative to the total weight of the slurry and dependant on the strength required. Other cements may be used. Lime may be present in a proportion by weight of from 0.01% to 1.0% and preferably is in the range of from 0.05% to 0.6%. The lime is not an essential ingredient of the composition but its omission significantly increases the gelling time of the composition and affects the rate of strength development. The lime may be provided as a result of the reaction of the cement and water. Other materials with similar reactivity such as sodium aluminate may be used. Blast furnace slag or like pozzolanic material may be present in a ratio by weight of from 0.5% to 15% and preferably is present in a range of from 2% to 10%. Activators for the pozzolanic material may be required. Additives such as accelerators, polymeric materials, surfactants, plasticisers, lubricants and the like may be present.

The invention is of especial value in relation to backfills formed of fines which have little or poor strength such as tailings; coal slurries; ores and waste or the like especially quarry/dredged sands. The nature of the tailings will vary according to the mine. (In some cases it is more economic to transport mined ores to a remote plant for processing and not economic to return the tailings to the mine; sand and aggregate or the like may be used instead of the tailings). An analysis of mine tailings from two mines is as follows:

| quartz | 39 | 34 |
|---|---|---|
| phlogopite | 21 | 7 |
| albite | 16 | 34 |
| tremolite | 10 | 7 |
| phyrrhotite | 7 | — |
| kaolinite | 6 | 8 |
| chlorite | 1 | 1 |
| magnetite | — | 6 |
| median particle size | 29.2 micron | 104 micron |
| specific gravity (20° C.) | 2.4 | 2.4 |

Irrespective of the nature of the tailings, or like placed material, the set material is homogeneous, hard and durable. Despite the presence of contained water, the set material is a non-liquifacient mass, i.e. it will not release water or liquify under vibration.

In order that the invention may be well understood it will now be described with reference to the following examples in which parts are by weight unless otherwise indicated. The sodium silicate used had a weight ratio of $SiO_2:Na_2O$ of 3.3:1. The weight of the tailings is dry weight. The abbreviation OPC stands for Ordinary Portland Cement and BFS for ground granulated blast furnace slag.

EXAMPLE I

Four slurries were made up as shown in Table 1 and placed in backfill bags. The rate of run-off water from the slurries and the compressive strength of the set material were determined. Composition 1 was a slurry of water and slimes only. Most of the water escaped from the backfill bag during an initial two hours and the run-off continued over at least a seven day period. The compressive strength was very low. Cementitious ingredients were present in composition 2 as indicated. Higher strength is imparted to the set backfill mass but there is negligible effect on the water run-off level. Composition 3 contains an additive comprising a blend of OPC, BFS and lime added to the backfill slurry in the proportions detailed, totalling 4.33% by weight. 0.85% by weight of sodium silicate solution was added to the backfill slurry just before the slurry is introduced into a backfill bag. The slurry and the sodium silicate solution are mixed thoroughly using a suitable static mixing head attached to a discharge end of a backfill delivery pipe. The sodium silicate rapidly gelled and the water of the backfill slurry was incorporated in the set fill so that the run-off was reduced to approximately 4%. The OPC, BFS and the lime allow the set backfill mass to achieve a high degree of compressive strength, (in the order of between 0.50 and 1.0 MPa). Composition 4 contained increased levels of additions of the sodium silicate, OPC, the slag and the lime. The level of run-off is further reduced and the compressive strength is increased.

EXAMPLE II

Four slurries were made up as indicated in Table 2.

Slurries 1 and 3 did not contain any gelling agent and were made up at 10:1 and 30:1 tailings:binder ratios respectively. The 10:1 ratio is frequently used in vertical retreat mining for the plug fill and the 30:1 ratio for the bulk fill. Slurries 2 and 4 contained the gelling agent and were made up at 7.5:1 and 25:1 tailings:binder ratio respectively. Higher binder contents were used than in the control mixes to give similar ultimate strengths with the higher retained water content. All slurries were made up at 70% bulk density.

Comparison of slurries 1 and 2 shows that water retention has been increased from 55 to 90% of the total water initially present and early strengths have been markedly increased, for example from 0 to 0.07 MPa at 12 hrs and from 0.103 MPa to 0.276 MPa at 3 days. Similar comparison of slurries 3 and 4 shows water retention increased from 71 to 92%, and the 12 hr strength from 0 to 0.02 MPa and 3 day strength from 0.04 to 0.09 MPa.

The higher water retention will increase yield, eliminate or reduce the need for drainage and drainage towers, enable unclassified tailings to be used and eliminate or reduce the need to handle the run-off water. The faster rate of strength development will allow faster filling of voids and more rapid mining of adjacent ore bodies.

Slurries 2 and 4 were used to fill a stope about 23 m high and 12 m × 12 m in area in a North American nickel mine. Slurry 2 was used as the plug fill in the bottom of the stope. Surprisingly better results were found in the field than in the laboratory. Negligible water run-off occurred and the slurry could be walked on 1 hour after placement.

Slurry 4 was used as the bulk fill and again gave negligible water run-off and rapid strength development. The filled stope was unaffected when the adjacent panel was mined one month later.

EXAMPLE III

Mixes were made up using different compositions as set out in Table III and the bleed and compressive strength were determined. These mixes show that by suitable adjustment of the settable binder materials and auxilliary agents and selection of different gellants, classified tailings can be backfilled with predetermined rate of bleed and development of compressive strength.

The result of composition 1 shows that in the absence of a gellant there is a high level of bleed and the set material has poor strength. Composition 2 contains BFS but neither cement nor lime but a gellant; while the bleed is reduced the strength of the set material is reduced. The addition of lime in composition 3 instead of the slag reduces the bleed but does not improve the strength. Composition 4 contains cement and a gellant; the bleed is reduced and the strength is improved. Composition 5 contains lime, cement, slag and accelerators and the bleed is reduced to 1% and the strength is 0.34 MPa. Composition 6 shows that the sodium silicate can be replaced by the silica sol; composition 7 shows that the sodium silicate can be replaced by aluminium sulphate. Composition 8 shows that a combination of OPC, BFS and lime improves the set strength. Composition 9 shows that the tailings can be replaced by sand. Composition 10 and 11 show the effect of increasing the content of sodium silicate gelling agent; increasing the content to 8% reduces the bleed and increases the set strength whereas increasing the level to 16% reduces the bleed but also decreases the set strength. For this reason and because of cost it is preferred to keep the level of gellant to a low level, say to about 2% to 3%. Composition 12 shows that increasing the content of slag and adding beta anhydrite increases the set strength.

The results of these Examples show that tailings and like waste particulate material when in the form of a slurry having a water content of about 30% may be placed and caused to settle into solid form with controlled loss of water to the extent that the mining engineer can backfill a void to a predetermined strength without having to wait for the water to bleed away and otherwise carry out any post placement treatment. Mining operations are speeded up as a result and the problems associated with bleed are avoided. In these examples the silicate used is sodium silicate but other silicates such as potassium silicate may also be used.

TABLE 2-continued

| Composition | 1 | 2 | 3 | 4 |
|---|---|---|---|---|
| Ca(OH)$_2$ | 0.08 | 0.10 | 0.14 | 0.16 |
| OPC | 2.1 | 2.7 | 0.7 | 0.85 |
| sodium silicate | 0 | 1.3 | 0 | 1.3 |
| tailings:binder ratio | 10:1 | 7.5:1 | 30:1 | 25:1 |
| % of total water retained after 24 hr. drainage i.e. bleed | 55 | 90 | 71 | 92 |
| | 45 | 10 | 29 | 08 |
| density at 24 hr. after drainage (Kg/m3) | 2170 | 2020 | 2090 | 2030 |
| Compressive strength (MPa) | | | | |
| 12 hour | 0 | 0.06 | 0 | 0.03 |
| 24 hour | 0.02 | 0.16 | 0 | 0.04 |
| 3 day | 0.01 | 0.27 | 0.04 | 0.09 |
| 7 day | 0.25 | 0.62 | 0.06 | 0.16 |
| 28 day | 1.03 | 1.15 | 0.24 | 0.33 |

TABLE 3

| COMPOSITION | 1 | 2 | 3 | 4 | 5 | 6 | 7 | 8 | 9 | 10 | 11 | 12 |
|---|---|---|---|---|---|---|---|---|---|---|---|---|
| Slurry | | | | | | | | | | | | |
| tailings | 58.1 | 53.0 | 53.0 | 53.1 | 58.1 | 63.2 | 61.3 | 61.6 | 63.9* | 61.6 | 61.6 | 61.8 |
| Ca(OH)$_2$ | 0.25 | — | 8.7 | — | 0.25 | 0.13 | — | 0.5 | 0.16 | 0.5 | 0.5 | 0.35 |
| CaO | 0.0 | — | — | — | — | — | — | — | — | — | — | — |
| OPC | 1.25 | — | — | 8.7 | 1.25 | 1.0 | 8.2 | 2.5 | 1.3 | 2.5 | 2.5 | — |
| BFS | 2.5 | 8.7 | — | — | 2.5 | 2.85 | — | 5.0 | 2.5 | 5.0 | 5.0 | 7.2 |
| beta CaSO$_4$ | — | — | — | — | — | — | — | — | 0.5 | — | — | 0.65 |
| bentonite clay | — | — | — | — | — | — | 0.5 | — | — | — | — | — |
| sodium aluminate | 0.2 | — | — | — | 0.2 | 0.11 | — | 0.4 | 0.4 | — | 0.4 | — |
| sodium carbonate | — | — | — | — | — | 0.6 | — | — | 0.2** | — | — | — |
| calcium carbonate | — | — | — | — | — | 0.03 | — | — | — | — | — | — |
| water | 37.7 | 38.3 | 38.3 | 38.3 | 37.7 | 31.6 | 30.0 | 30.0 | 32.0 | 30.0 | 30.0 | 30.0 |
| Gellant | | | | | | | | | | | | |
| sodium silicate | — | 1.3 | 1.3 | 1.3 | 1.0 | — | — | 1.0 | 1.0 | 8.0 | 16.0 | 1.0 |
| silica sol | — | — | — | — | — | 1.0 | — | — | — | — | — | — |
| aluminium sulphate | — | — | — | — | — | — | 3.2 | — | — | — | — | — |
| Results | | | | | | | | | | | | |
| Bleed (%) | 20 | 11 | 6 | 5 | 1 | 3 | 0 | 1 | 0 | 0.5 | 0 | 1 |
| 7 day compressive strength (MPa) | 0 | 0 | — | 0.34 | 0.34 | 0.27 | 0.9 | 0.8 | 0.5 | 4.5 | 0.7 | 1.4 |

*sand
**Al$_2$(SO$_4$)$_3$.14H$_2$O

TABLE 1

| | 1 | 2 | 3 | 4 |
|---|---|---|---|---|
| slimes | 71.43 | 67.45 | 67.72 | 64.39 |
| water | 28.57 | 26.98 | 27.10 | 25.76 |
| BFS | — | 5.06 | 2.71 | 5.15 |
| Ca(OH)$_2$ | — | 0.51 | 0.27 | 0.52 |
| OPC | — | — | 1.35 | 2.58 |
| sodium silicate | — | — | 0.85 | 1.60 |
| | 100.00 | 100.00 | 100.00 | 100.00 |
| total % additives | 0 | 5.57 | 5.18 | 9.85 |
| slurry density | 1.72 | 1.74 | 1.74 | 1.75 |
| run-off % after: | | | | |
| 2 hours | 70.1 | 66.3 | 4.2 | 2.2 |
| 24 hours | 8.9 | 8.5 | 0.4 | 0.2 |
| 7 days | 1.3 | 0 | 0 | 0 |
| total bleed | 80.3 | 74.8 | 4.6 | 2.4 |
| compressive strength (MPa) (28 day) | 0.21 | 1.91 | 0.74 | 0.98 |

TABLE 2

| Composition | 1 | 2 | 3 | 4 |
|---|---|---|---|---|
| Slurry | | | | |
| classified mine tailings | 63.62 | 61.8 | 67.76 | 67.31 |
| water | 30 | 30 | 30 | 30 |
| Binder | | | | |
| slag | 4.2 | 5.4 | 1.4 | 1.7 |

I claim:

1. A method of forming an infill in an underground void, the method comprising forming a backfill slurry comprising about 15 to 55% by weight of water, a substantially inert filler and 0.5 and 15% of a binder, the weight ratio of the substantially inert filler to the binder ranging from about 7.5:1 to 30:1, the method further comprising transporting the slurry to the void and placing the slurry therein, and adding an inorganic gelling agent therefor while or just before the slurry is placed, the quantity of gelling agent added being from about 0.3 to about 8% by weight relative to the weight of the slurry thereby to cause the slurry to set to form a set material infill containing substantially all the water of the slurry.

2. A method according to claim 2, wherein the gelling agent is present in a concentration of from about 0.5% to about 2% by weight, relative to the weight of the slurry.

3. A method according to claim 1, wherein the gelling agent is a silicate.

4. A method according to claim 3, wherein the gelling agent is sodium silicate or a silica sol.

5. A method according to claim 1, wherein the gelling agent is aluminium sulphate.

6. A method according to claim 1, wherein the binder comprises one or more of a cement, lime, pozzolanic material or the like.

7. A method according to claim 5, wherein the cement is Ordinary Portland cement present in a concentration of about 0.5% to about 15% by weight of the slurry.

8. A method according to claim 6, wherein lime is present in a concentration of about 0.01% to about 1% by weight of the slurry.

9. A method according to claim 6, wherein pozzolanic material is present together with activators therefor.

10. A method according to claim 8, wherein blast furnace slag is present as the pozzolanic material in a concentration of about 0.5% to about 15% by weight of the slurry.

11. A method according to claim 1, wherein the substantially inert filler is a mine waste material, rockfill, aggregate, coal, sand or the like.

12. A method according to claim 1, wherein the water content of the slurry is about 25% to about 40% of the weight of the slurry.

13. A method according to claim 1, wherein the weight ratio of the substantially inert filler to the binder ranges from about 10:1 to about 30:1.

14. A method of infilling an underground void in a mine or tunnel, the method comprising making a backfill slurry comprising water in a proportion of from about 15% to about 50% by weight of the slurry, a hydraulically settable binder in a weight proportion from about 0.5% to about 15% of the slurry, the balance comprising a substantially inert filler selected from the group comprising mine tailings, other mine waste, slimes, rockfill, aggregate, coal, sands and mixtures of any of these, the weight ratio of the substantially inert filler to the binder ranging from about 7.5:1 to 30:1, the method further comprising transporting the slurry in a transport pipe to the void and discharging the slurry therefrom into the void, and adding a gelling agent to the slurry while or just before the slurry exists from the pipe, the gelling agent being added in a proportion of from about 0.3 to about 8% of the slurry to cause the slurry to set to form a substantially homogeneous infill containing substantially all the content of water from the slurry.

* * * * *